(12) United States Patent
Kwan-Gett

(10) Patent No.: US 10,426,281 B2
(45) Date of Patent: Oct. 1, 2019

(54) UTENSILS, INCLUDING FORKS WITH MOVABLE COMPONENTS, AND ASSOCIATED SYSTEMS AND METHODS

(71) Applicant: Clifford Kwan-Gett, Poway, CA (US)

(72) Inventor: Clifford Kwan-Gett, Poway, CA (US)

( * ) Notice: Subject to any disclaimer, the term of this patent is extended or adjusted under 35 U.S.C. 154(b) by 0 days.

(21) Appl. No.: 16/141,589

(22) Filed: Sep. 25, 2018

(65) Prior Publication Data

US 2019/0099023 A1    Apr. 4, 2019

Related U.S. Application Data

(60) Provisional application No. 62/566,615, filed on Oct. 2, 2017.

(51) Int. Cl.
| | | |
|---|---|---|
| *A47J 43/28* | (2006.01) |
| *A47G 21/02* | (2006.01) |
| *A47G 21/06* | (2006.01) |
| *A47G 21/10* | (2006.01) |

(52) U.S. Cl.
CPC .......... *A47G 21/023* (2013.01); *A47G 21/06* (2013.01); *A47G 21/10* (2013.01); *A47G 21/103* (2013.01); *A47J 43/283* (2013.01)

(58) Field of Classification Search
CPC ...... A47G 21/023; A47G 21/06; A47G 21/10; A47G 21/103; A47J 43/283; A47J 43/288
USPC .................................................. 294/99.2, 3
See application file for complete search history.

(56) References Cited

U.S. PATENT DOCUMENTS

| | | | | |
|---|---|---|---|---|
| 1,331,851 A | * | 2/1920 | Ouzoun-Boghossian ................... | |
| | | | | G04D 1/021 |
| | | | | 24/569 |
| 2,511,142 A | * | 6/1950 | Zwoboda ............... | A47J 43/283 |
| | | | | 294/106 |
| 2,864,645 A | * | 12/1958 | Meldrum ................ | A47G 21/10 |
| | | | | 294/106 |
| 3,285,648 A | * | 11/1966 | Pryce ...................... | A47J 45/10 |
| | | | | 294/33 |
| 3,414,310 A | * | 12/1968 | Hiroshi ................ | A47G 21/103 |
| | | | | 294/106 |
| 3,596,965 A | | 8/1971 | Woofter | |
| 3,692,347 A | | 9/1972 | Bixler | |

(Continued)

FOREIGN PATENT DOCUMENTS

| | | |
|---|---|---|
| CN | 85202590 U | 4/1986 |
| CN | 2136630 Y | 6/1993 |

(Continued)

OTHER PUBLICATIONS

Bir, Sara; "The Sausagetarian", http://www.susagetarian.com/journal/2014/05/20inspector-gadget , May 20, 2014, 4 pages.

(Continued)

*Primary Examiner* — Gabriela M Puig
(74) *Attorney, Agent, or Firm* — Perkins Coie LLP

(57) ABSTRACT

Utensils, including forks, with movable components, and associated systems and methods are disclosed. A representative utensil includes a first tool carried by and movable relative to a first arm portion, a second tool carried by and movable relative to a second arm portion, and a hinge coupling the first and second arm portions. A guide structure is coupled to the first and second arm portions to guide motion of at least one of the first and second tools relative to the other.

4 Claims, 13 Drawing Sheets

(56) References Cited

U.S. PATENT DOCUMENTS

| | | | | |
|---|---|---|---|---|
| 3,889,995 | A | * | 6/1975 | Lin ................. A47G 21/103 294/99.2 |
| 3,977,410 | A | * | 8/1976 | Huston ............ A61B 17/30 606/210 |
| RE30,124 | E | * | 10/1979 | Ciano ............... B25B 9/02 294/33 |
| 4,461,297 | A | * | 7/1984 | Sutter .............. A61B 17/30 294/99.2 |
| 4,973,095 | A | * | 11/1990 | Kunihisa ......... A47G 21/103 294/33 |
| 5,373,640 | A | * | 12/1994 | Cordeiro, Jr. .... A47G 21/023 294/99.2 |
| 5,697,659 | A | * | 12/1997 | Calagui ........... A47G 21/103 294/33 |
| 8,348,316 | B2 | * | 1/2013 | Hemmings ....... A47J 43/283 294/7 |
| 8,459,708 | B1 | | 6/2013 | Sandorfi |
| 8,782,907 | B2 | | 7/2014 | Chong |
| 10,136,745 | B1 | * | 11/2018 | Reed ................ A47G 21/02 |
| 2006/0244275 | A1 | * | 11/2006 | Bases ............... A47J 43/288 294/3 |
| 2008/0036226 | A1 | | 2/2008 | Yoon |
| 2008/0179903 | A1 | | 7/2008 | Tardif et al. |
| 2010/0050441 | A1 | * | 3/2010 | Spaulding ........ B26B 13/06 30/142 |
| 2011/0044370 | A1 | * | 2/2011 | Schochet ......... A47J 43/283 374/155 |
| 2013/0049386 | A1 | | 2/2013 | Lv |
| 2014/0173909 | A1 | | 6/2014 | Chong |
| 2016/0029608 | A1 | * | 2/2016 | Pangrcic .......... A01K 97/04 43/4.5 |

FOREIGN PATENT DOCUMENTS

| | | | | |
|---|---|---|---|---|
| CN | 2171268 | Y | 7/1994 | |
| CN | 2243837 | Y | 1/1997 | |
| CN | 2396725 | Y | 9/2000 | |
| CN | 2520777 | Y | 11/2002 | |
| CN | 1454561 | A | 11/2003 | |
| CN | 2910009 | Y | 6/2007 | |
| CN | 202489697 | U | 10/2012 | |
| CN | 202843178 | U | 4/2013 | |
| CN | 203000372 | U | 6/2013 | |
| CN | 203168739 | U | 9/2013 | |
| CN | 203802181 | U | 9/2014 | |
| CN | 2038021280 | U | 9/2014 | |
| CN | 104414364 | A | 3/2015 | |
| CN | 104586200 | A | 5/2015 | |
| CN | 204542269 | U | 8/2015 | |
| CN | 205322180 | U | 6/2016 | |
| CN | 205649284 | U | 10/2016 | |
| FR | 748047 | A * | 6/1933 | ............ A47G 21/10 |
| JP | 201378516 | A | 5/2013 | |
| KR | 10-20130051055 | A | 5/2013 | |
| WO | 9705814 | A1 | 2/1997 | |
| WO | 2007049887 | A1 | 5/2007 | |
| WO | 2014134434 | A1 | 9/2014 | |

OTHER PUBLICATIONS

"Thingiverse" https://www.thingiverse.com/thing:1392229 , Aug. 17, 2017, 1 page.

Sorrel, Charlie; "Little Rubber Brick Turns Anything into Kitchen Tongs" , Wired, Jun. 30, 2011, 2 pages.

International Search Report and Written Opinion issued for PCT/US18/52686 dated Dec. 31, 2018.

* cited by examiner

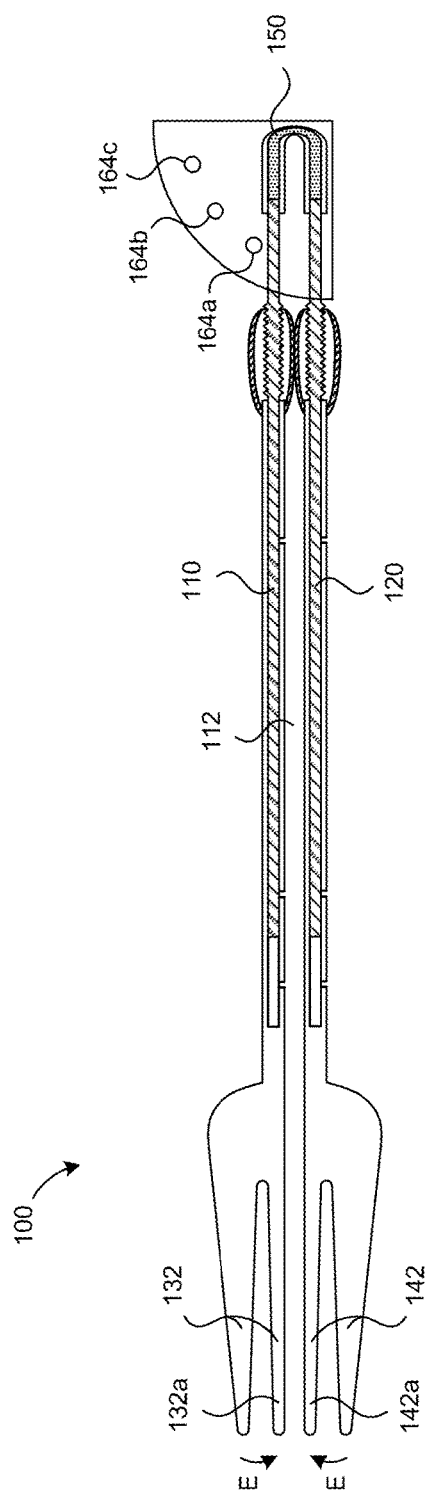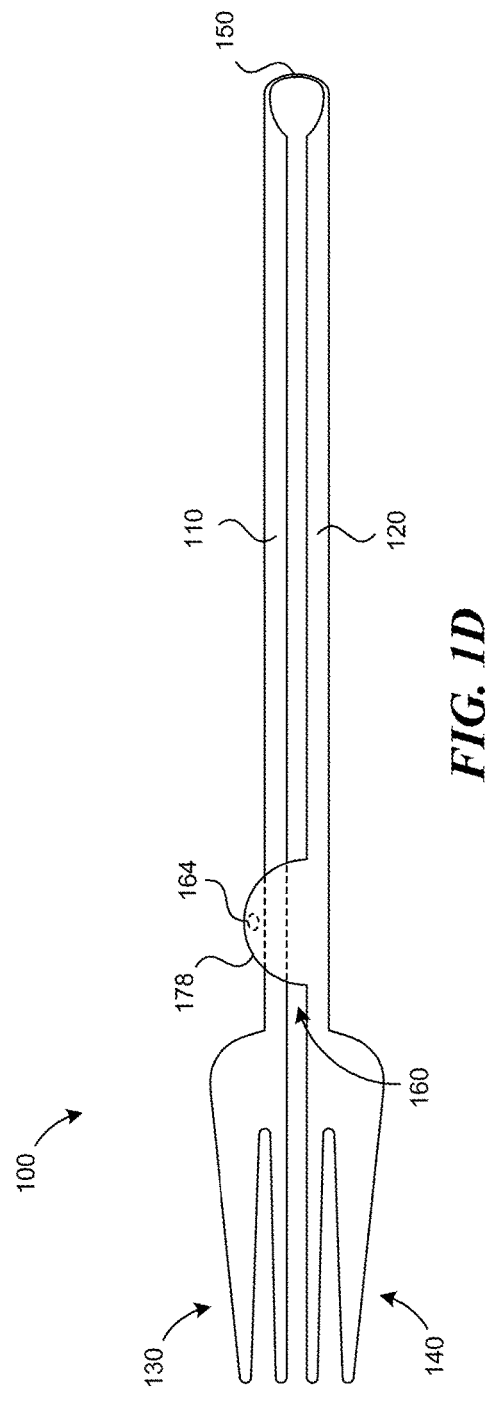

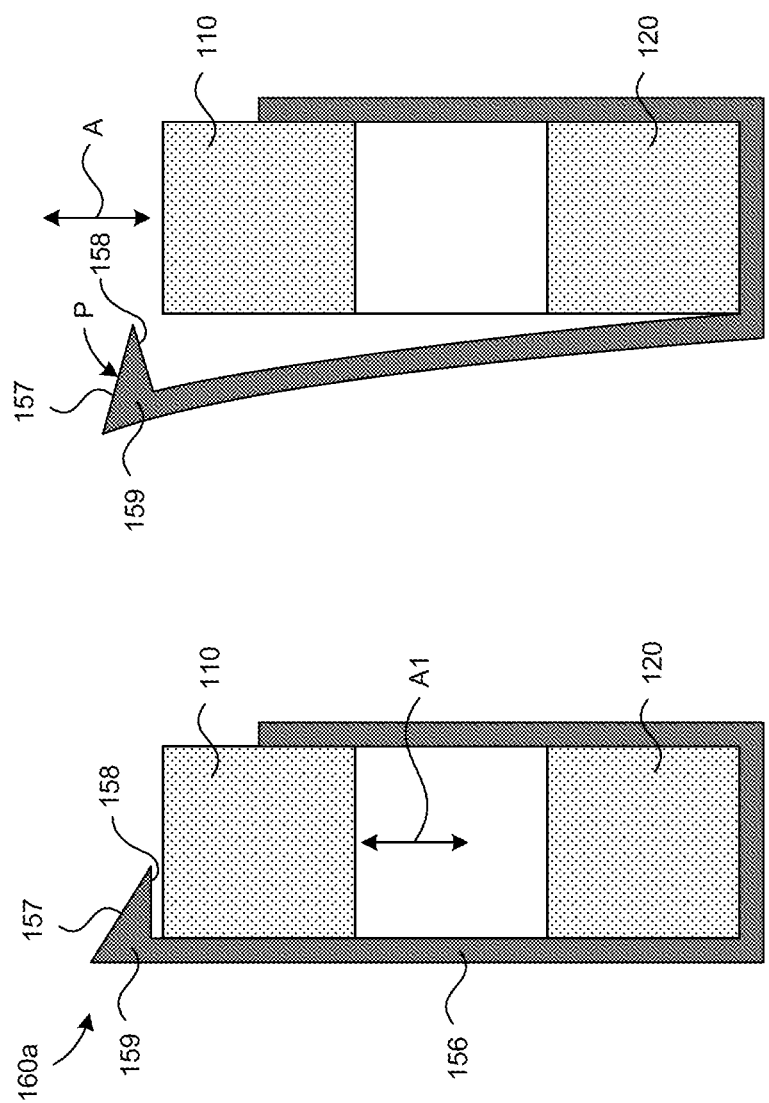

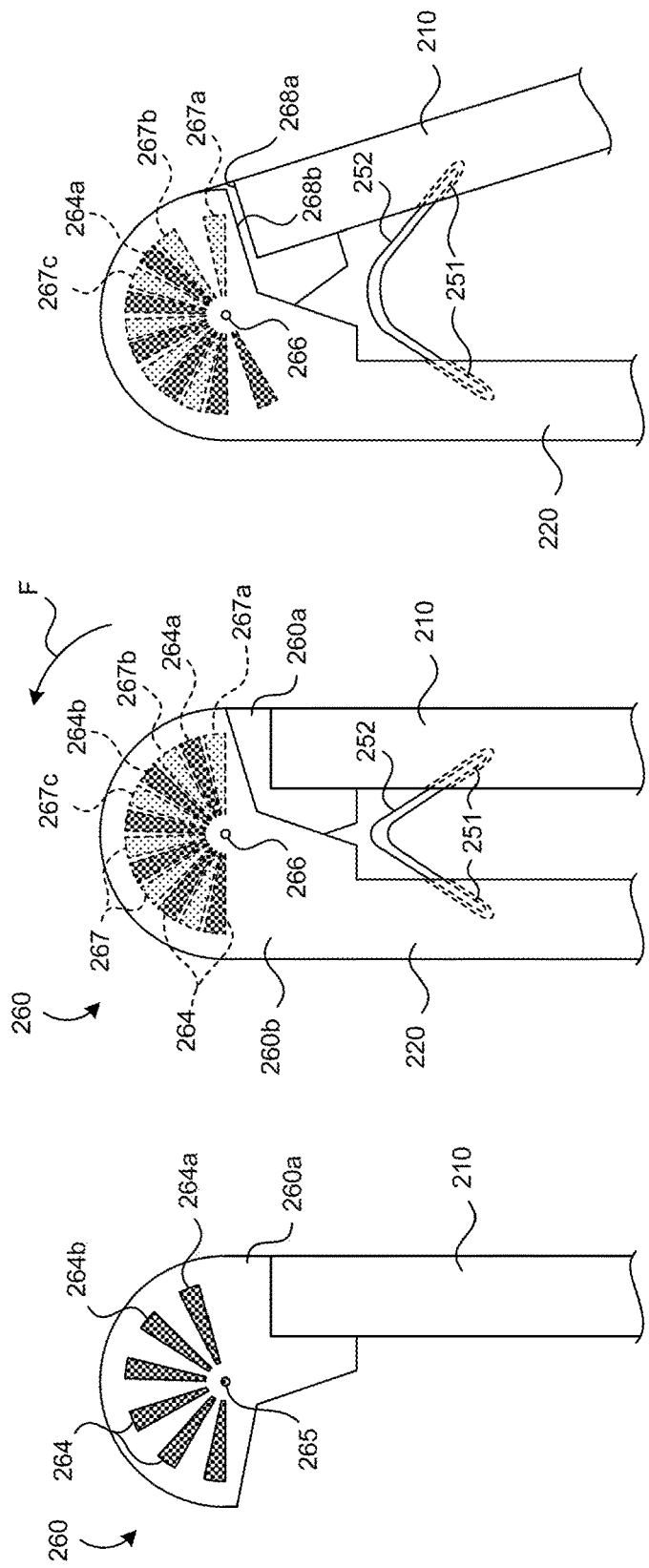

UTENSILS, INCLUDING FORKS WITH MOVABLE COMPONENTS, AND ASSOCIATED SYSTEMS AND METHODS

CROSS-REFERENCE TO RELATED APPLICATION

The present application claims priority to U.S. Provisional Application No. 62/566,615, filed on Oct. 2, 2017 and incorporated herein by reference.

TECHNICAL FIELD

The present technology is directed generally to utensils, including forks, with movable components, and associated systems and methods.

BACKGROUND

Common dining utensils, such as forks and spoons, have been in use for centuries, if not millennia. A drawback with some existing utensils is that they are typically single-purpose, and therefore have limited applications. Another potential drawback is that such utensils may be difficult to use for people with disabilities, such as blindness and/or hand tremors. Accordingly, there remains a need for improved dining utensils.

BRIEF DESCRIPTION OF THE DRAWINGS

FIG. 1C is a partially schematic, cross-sectional illustration of the utensil shown FIG. 1A, with the fork portions moved together, in accordance with some embodiments of the present technology.

FIG. 1D is a partially schematic illustration of a utensil having a simplified construction, in accordance with some embodiments of the present technology.

FIGS. 1F and 1G are partially schematic, cross-sectional illustrations of the guide shown in FIG. 1E, shown in a secured position (FIG. 1F) and a released position (FIG. 1G), in accordance with embodiments of the present technology.

FIGS. 2A-2C illustrate a configuration for pivoting portions of a utensil, in accordance with some embodiments of the present technology.

The foregoing Figures are not necessarily drawn to scale, for purposes of illustration.

DETAILED DESCRIPTION

The present technology is directed generally toward utensils, including forks, with movable components, and associated systems and methods. In some embodiments, utensils configured in accordance with the present technology can aid users with disabilities, for example, blind users, and/or users with hand tremors. In some embodiments, utensils configured in accordance with the present technology can provide multiple functions, within, or outside the context of dining. Accordingly, utensils configured in accordance with such embodiments can provide expanded utility, not associated with conventional utensils.

Several details describing structures or processes that are well-known and often associated with utensils and associated methods of manufacture and/or use, but that may unnecessarily obscure some significant aspects of the present technology, are not set forth in the following description for purposes of clarity. Moreover, although the following disclosure sets forth some embodiments of the technology, some embodiments can have different configurations or different components than those described in this section, without departing from the scope of the present technology. As such, the present technology may have other embodiments with additional elements, and/or without several of the elements described below with reference to FIGS. 1A-6E.

In several of the representative arrangements described below, the utensil can include two arms or arm portions that are movably connected to each other, e.g., with an axle pivot and/or another hinge, with or without a spring. In some embodiments, the arms are biased away from each other, and the user can squeeze them together during use. Each arm can include a tool, for example, a fork or portion of a fork, a spoon, a cover, a spatula, and/or another suitable device. The utensil can further include a latch or detent arrangement that allows the user to easily move back and forth between or among pre-selected positions. The tools can be interchangeable, allowing the user to select the combination of tools most suitable to a particular user and/or task the user wishes to complete. Accordingly, the various combinations of the foregoing elements can provide simpler and/or more versatile utensils.

Figure 1A:
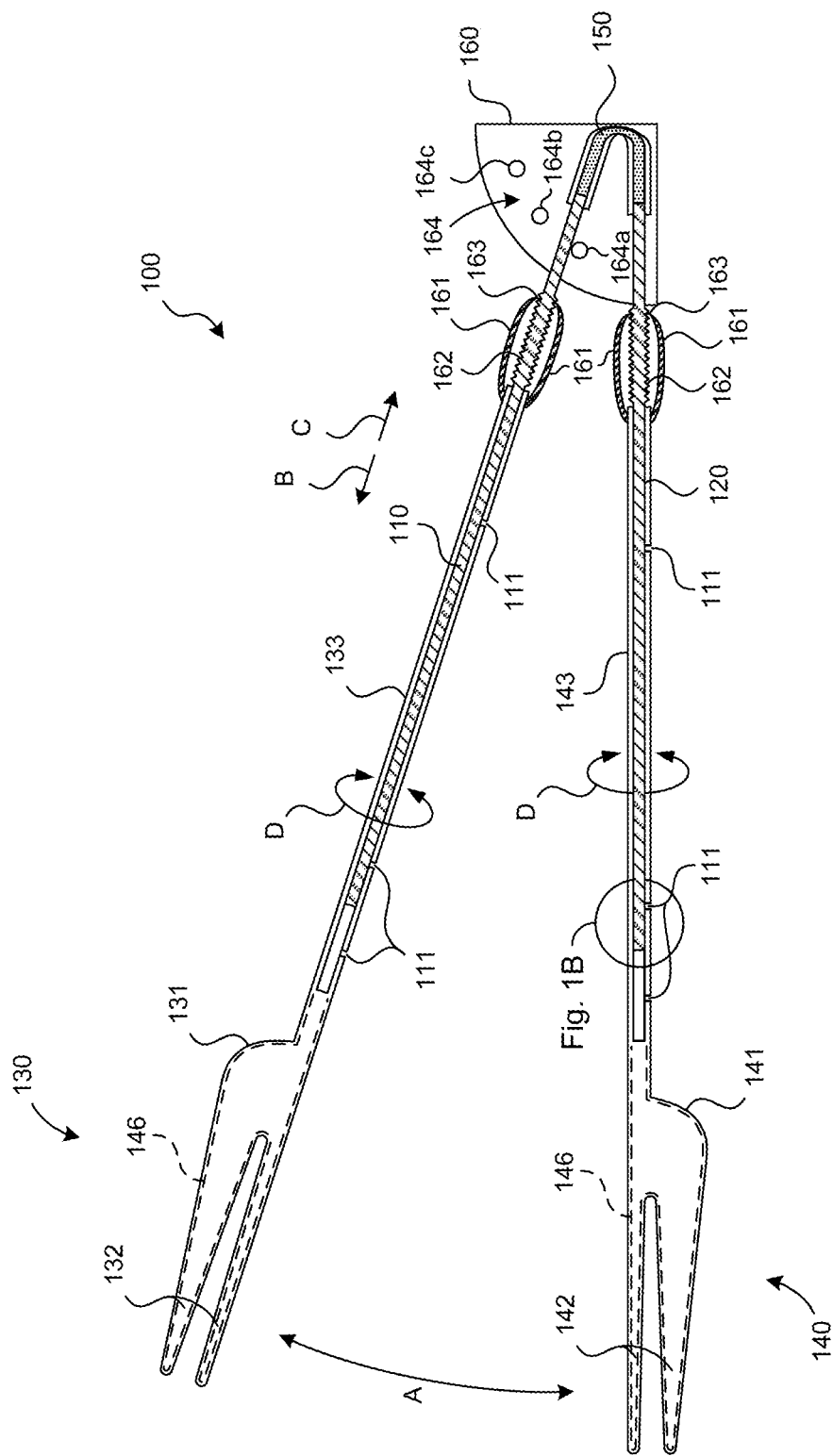
FIG. 1A is a partially schematic, partial cross-sectional illustration of a representative utensil having two movable fork portions in accordance with some embodiments of the present technology.
Figure 1B:
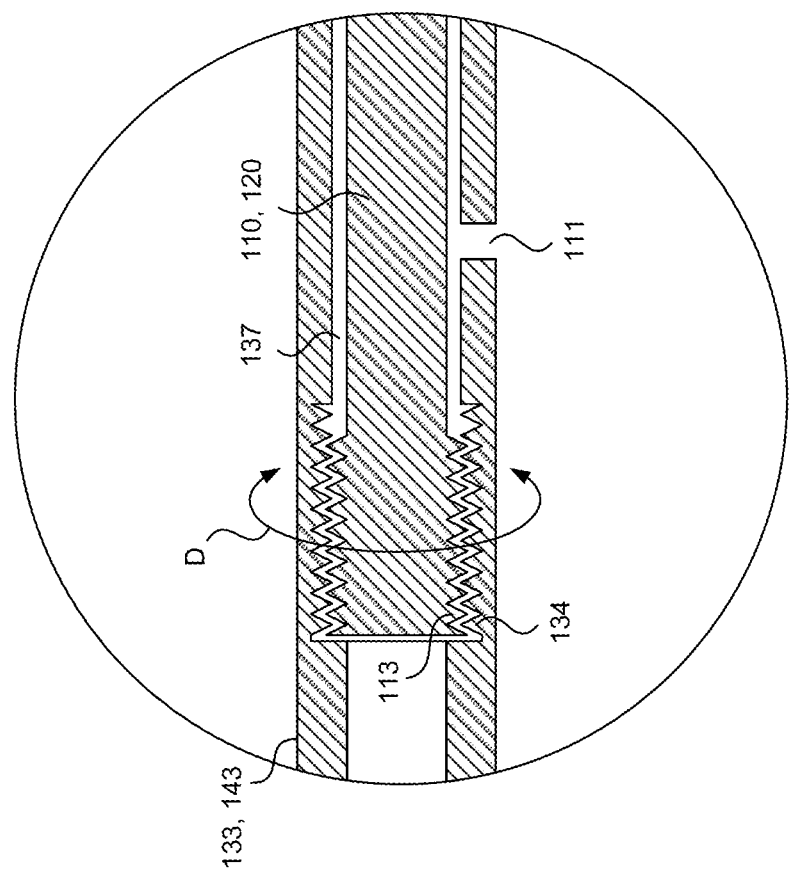
FIG. 1B is a partially schematic, partial cross-sectional illustration of a portion of the utensil shown in FIG. 1A.

FIG. 1A is a partially schematic, partial cross-sectional illustration of a utensil 100 configured in accordance with some embodiments of the present technology. The utensil 100 can include a first tool 130 coupled to a second tool 140, so that one or both of the tools 130, 140 are movable relative to the other. In a particular example, the first tool 130 includes a first fork portion 131 having first fork tines 132, and the second tool 140 includes a second fork portion 141 having second fork tines 142. The tines 141, 142 and/or other portions of the first and second tools 130, 140 can include ridges 146 and/or other features to increase stiffness. These features can be located on the rear surfaces of the tools 130, 140. The tines 141, 142 can be curved into/out of the plane of FIG. 1A in the manner of a conventional fork. The first and second tools 130, 140 are carried by corresponding first and second arm portions 110, 120. The arm portions 110, 120 can be connected by a hinge 150 that facilitates relative rotational motion of the arm portions 110, 120, as indicated by arrow A. The hinge 150 can operate as a spring and/or can include a spring, e.g., so as to bias the arm portions 110, 120 away from each other to the position show in FIG. 1A (e.g., a default position), in addition to facilitating arcuate or angular motion of one arm portion relative to the other. As described later with reference to FIGS. 2A-2C, in some embodiments, these two functions can be separated via a pivot pin or axle, and a separate spring. In either of the foregoing examples, the user can squeeze the arm portions 110, 120 toward each other to form a more conventional-looking fork, as described further below with reference to FIG. 1C.

With continued reference to FIG. 1A, the first tool 130 can include a first handle portion 133, and the second tool 140 can include a second handle portion 143. Each of the handle portions 133, 143 is attached to its corresponding arm portion 110, 120, and, in some embodiments, the handle portions 133, 143 are removably attached to the corresponding arm portions 110, 120. For example, each handle portion 133, 143 can include one or more detent arms 161 having a free end 163 that slides along corresponding axial motion detents 162. The axial motion detents 162 can include external threads, or other protrusions that interface with the free ends 163 of the detent arms 161. The detent arms 161 can be biased inwardly toward the associated arm portion 110, 120 so as to engage with the axial motion detents 162. To remove the tools 130, 140 from the corresponding arm portions 110, 120, the user slides the tools toward the left (as indicated by arrow B in the view shown in FIG. 1A) to disengage the detent arms 161 from the corresponding axial motion detents 162. To connect or re-connect a tool, the user slides the tool in the opposite direction, as indicated by arrow C. The user can also adjust the relative axial positions of the first tool 130 and/or the second tool 140 by sliding one or both tools axially, as indicated by arrows B and C, without removing the tool(s). While the axial motion detents 162 are illustrated in FIG. 1A as extending over a relatively small portion of the entire length of the arm portions 110, 120, the axial motion detents 162 can in at least some implementations, extend over nearly the entire length of the arm portion 110, 120, thus allowing the user to position the corresponding tool 130, 140, at any of a greater variety of axial positions. In this case, the interior opening in the arm portions 110, 120 can be smooth-walled and large enough to accommodate the axial motion detents 162. During a typical use, both the first and second tools 130, 140 will have the same axial position. As described later with reference to FIGS. 5-6B, the ability to move the tools axially and/or arcuately or radially relative to each other can provide additional benefits.

In some embodiments, the utensil 100 can have different arrangements for moveably/removably securing the tools 130, 140 to the corresponding arms portions 110, 120. For example, as shown in greater detail in FIG. 1B, in some embodiments, the first and second arm portions 110, 120 can each include external threads 113 that threadably engage with corresponding internal threads 134 carried by the corresponding handle portions 133, 143. Accordingly, the user can swap out the first and second tools 130, 140 (FIG. 1A) for other tools having other configurations by unscrewing the first tool 130 and/or the second tool 140 from the corresponding arm portion 110, 120 and replacing the removed tool with a different tool. The now-open internal passage 137 of the tool 130, 140 can be cleaned, with cleaning vents 111 allowing the user to insert a cleaning tool, and/or a cleaning solution to enter and/or exit the internal passage. If desired, the user can also twist either or both of the tools 130, 140 relative to each other, as indicated by arrow D, e.g., to align the tines 132, 142 (FIG. 1A) to face toward each other, rather than to be side by side (as is shown in FIG. 1A). The threads 134 can be used to remove/replace one or both of the tools 130, 140 and/or to adjust the axial positions of one or both tools 130, 140. Other suitable arrangements for relative axial motion are described above, and later with reference to FIGS. 5-6E. Such arrangements may be easier for the user to implement because they do not require rotating the tool(s) to change the axial position of the tool(s).

With continued reference to FIG. 1A, the first and second tools 130, 140 can also move arcuately relative to each other, as indicated by arrow A. In some embodiments, the utensil 100 can include a guide 160 that guides the arcuate motion. For example, the guide 160 can include one or more arcuate motion detents 164 arranged generally along an arc. In an embodiment illustrated in FIG. 1A, the utensil 110 includes three arcuate motion detents 164, indicated by reference numerals 164a, 164b, and 164c. The arcuate motion detents 164 can have the form of bumps or other protrusions extending upwardly from the plane of FIG. 1A, or the detents 164 can have other suitable arrangements. In operation, the user moves the first arm portion 110 toward and away from the second arm portion 120, over the protruding arcuate motion detents 164, to position the arm portions 110, 120 in a desired relative location. If the hinge 150 is configured to bias the first arm portion 110 to the position shown in FIG. 1A, the arcuate motion detents 164 provide enough resistance to keep the first arm portion 110 in any of the other available positions, while not providing so much resistance that the user has difficulty moving the first arm portion 110 relative to the second arm portion 120 over the arcuate motion detents 164.

FIG. 1C illustrates the utensil 100 with the first arm portion 110 moved from a position in which it is between the first and second arcuate detents 164a, 164b (FIG. 1A), to position in which it is inside the first arcuate motion detent 164a. In this position, the utensil 100 has a conventional fork configuration, with the exception of a gap 112 that extends between the two arm portions 110, 120 and between the first tines 132 and second tines 142. If desired, the user can further pivot the first and/or second tools 110, 120 toward each other, as indicated by arrows E, so that the tips of the two innermost tines 132a, 142a move toward each other and, optionally, touch each other. The inner facing surfaces of the innermost tines 132a, 142a can accordingly be flat, and can optionally include scoring and/or other features to enhance the grip between the tines and the object to be picked up. An advantage of this configuration is that the user can use the utensil 100 in the manner of a pair of tweezers to pick up small items, such as fish bones, a grain of rice, and/or or other items that may be difficult to handle with a conventional fork.

In any of the embodiments described herein, the representative utensils can be formed from any of a variety of suitable materials. For example, the utensils can be formed from metal, hard plastics, and/or other materials suitable for multiple uses over a long period of time. In some embodiments, the utensil can be formed from more inexpensive plastics, or biodegradable or other disposable materials, for example, for single-use applications. Accordingly, the utensils can be deliberately constructed for single-use or short-term use, or the utensils can be configured for long-term use.

FIG. 1D illustrates a representative utensil 100 having a simplified configuration that may be particularly suitable for single-use applications. Accordingly, the tools 130, 140, the first and second arm portions 110, 120, and the hinge 150 can all be formed integrally to provide a one-piece construction. The guide 160 can also be formed integrally with the foregoing components, and can have the form of a clip or latch 178 that extends from the second arm portion 120 over the first arm portion 110, and can include one or more downwardly extending detents 164 to control the relative positions of the first and second arm portions 110, 120. While the utensil 100 is illustrated with two fork tools 130, 140, in another embodiments the utensil 100 can include other types of tools, as described further below. The arm portions 110, 120 can have any suitable cross-sectional shape (e.g., circular, rounded, square, rectangular), selected based on user comfort, manufacturability, and/or other factors.

Figure 1E:
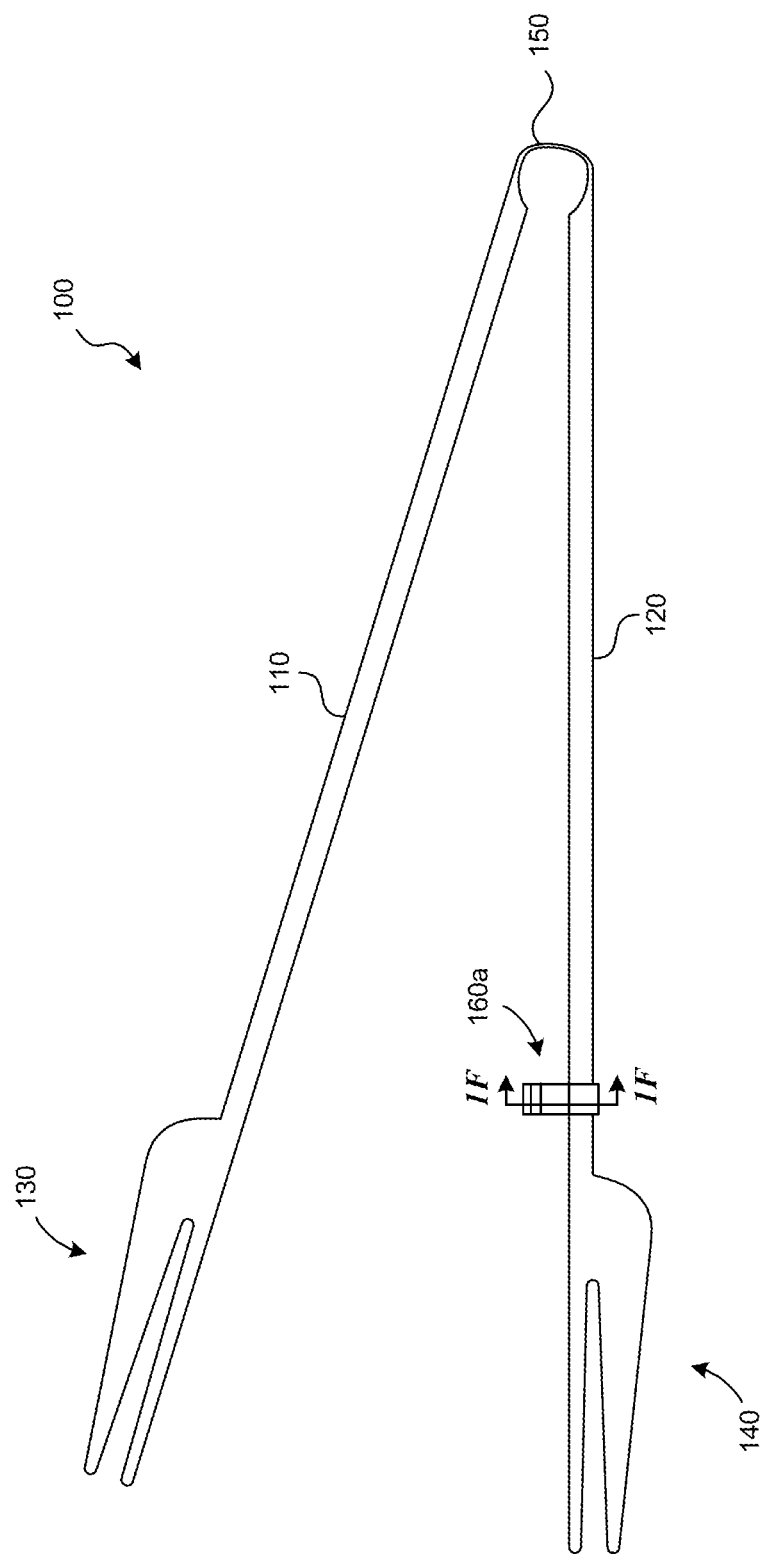
FIG. 1E is a partially schematic illustration of a representative utensil having two movable fork portions and a guide configured in accordance with some embodiments of the present technology.

FIG. 1E is a partially schematic illustration of a representative utensil 100 that includes a first tool 130 and a second tool 140, each of which has a fork-type configuration, generally as discussed above. The first tool 130 can be carried by a first arm portion 110, and the second tool 140 can be carried by a second arm portion 120, with both arm portions 110, 120, connected via an integral or otherwise formed hinge 150 to allow arcuate motion of one arm relative to the other. Accordingly, the foregoing portions of the utensil 100 can be formed from a single piece of material. The hinge 150 can bias the arm portions 110, 120 outwardly, e.g., to 10°, 15°, 20°, 25°, 30° or 35°. The arcuate motion can be controlled by a guide 160a, which can be attached to, or integrally formed with, the rest of the utensil 100. In a representative embodiment, the guide 160a is connected to the second arm portion 120 and can be configured to selectively limit or not limit the motion of the first arm portion 110 relative to the second arm portion 120.

FIG. 1F is a partially schematic, cross-sectional view of a representative guide 160a, taken substantially along line 1F-1F of FIG. 1E. As shown in FIG. 1F, the guide 160a can have a partially enclosed, generally U- or C-type configuration, with the second arm portion 120 positioned toward the inside of the partially enclosed region, where it is connected to the guide 160a. The first arm portion 110 is positioned toward an openable end of the partially enclosed region. The guide 160a can include a retainer 159 that, in the position shown in FIG. 1F, constrains the motion of the first arm portion 110 to move toward and away from the second arm portion 120 in the region bounded by the retainer 159 and the second arm portion 120, as indicated by arrow A1. The retainer 159 can be carried by a retainer arm 156 so as to bend or otherwise move away from the motion path of the first arm 110, as described further below with reference to FIG. 1G. The retainer 159 can include a stop surface 158 that restricts the motion of the first arm portion 110, and a guide surface 157 that facilitates the first arm portion 110 re-entering the space bounded by the retainer 159 and the second arm portion 120, as is also described below with reference to FIG. 1G.

In FIG. 1G, a user has pushed the retainer 159 away, as indicated by arrow P, thus allowing the first arm portion 110 to move toward and away from the second arm portion 120, with a greater degree of freedom than in the configuration shown in FIG. 1F, as indicated by arrow A. Once the first arm portion 110 has been moved outside the region bounded by the retainer 159 and the second arm portion 120, the user can release the retainer 159, with the first arm portion 110 positioned outside, rather than inside the retainer 159. The user can operate the first arm portion 110 in this configuration until the user wishes to return to the configuration shown in FIG. 1F. In that case, the user moves the first arm portion 110 toward the second arm portion 120, so that it slides over the guide surface 157 and latches into position within or against the stop surface 158.

FIGS. 2A-2C illustrate another arrangement for controlling the arcuate motion of representative utensils, in accordance with some embodiments of the present technology. FIG. 2A illustrates a representative first arm portion 210 having (or attached to) a first portion 260a of a guide 260. The first portion 260a has upwardly-facing detents 264, including first and second upwardly-facing detents 264a, 264b. For purposes of illustration, the upwardly-facing detents 264 are shown with hatching in FIGS. 2A-2C. A pivot aperture 265 is provided to pivotably couple the first arm portion 210 to a second arm portion 220, described below.

In FIG. 2B, the second arm portion 220, which has a corresponding second portion 260b of the guide structure 260 (with downwardly-facing detents 267), is placed over the first arm portion 220 and attached via a pivot pin 266. The first and second portions 260a, 260b can be generally flat and disc-shaped with enough face-to-face contact area to restrict or eliminate wobble. The second arm portion 220 can be sized and shaped identically to the first arm portion 210 in some embodiments, for ease of manufacturing. For purposes of illustration, the downwardly-facing detents 267 are shown with stippling in FIGS. 2B-2C. In this configuration, the downwardly-facing detents 267 of the second arm portion 220 alternate with the upwardly-facing detents 264 of the first arm portion 220. Accordingly, the first upwardly-facing detent 264a is between first and second downwardly-facing detents 267a, 267b, and the second upwardly-facing detent 264b is between the second downwardly-facing detent 267b and a third downwardly-facing detent 267c.

Each of the arm portions 210, 220 can include a spring aperture 251. A spring 252 can be inserted into the spring aperture 251 and can bias the first and second arm portions 210, 220 away from each other, with the interfaces between the downwardly-facing detents 267 and the upwardly-facing detents 264 resisting the outward force provided by the spring 252.

In the configuration shown in FIG. 2B, the first upwardly-facing detent 264a is between the first and second downwardly-facing detent 267a, 267b. When the first arm portion 210 is rotated counterclockwise, as indicated by arrow F, relative to the second arm portion 220, the relative positions of the downwardly-facing detents 267 and the upwardly-facing detents 264 changes, as shown in FIG. 2C. In particular, the first upwardly-facing detent 264a has now shifted so that it is between the second and third downwardly-facing detents 267b, 267c. The maximum extent of the motion described above may be controlled by corresponding stop surfaces 268a, 268b of the arm portions 210, 220 so as to prevent the arm portions from over-rotating relative to each other. The detents 264, 267 can be arranged to releasably hold the first and second arm portions 210, 220 at any suitable number of positions between a fully closed position and a fully opened position.

Figure 5:
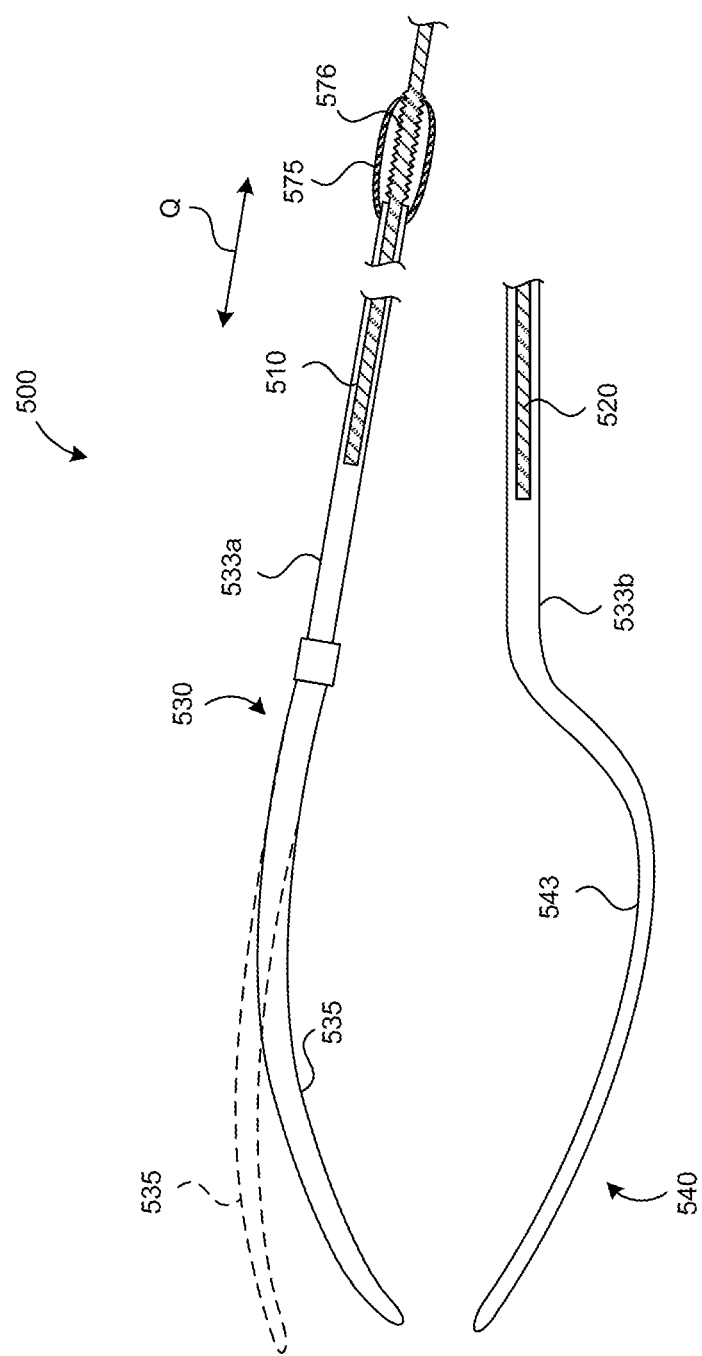
FIG. 5 is a partially schematic illustration of a utensil having movable fork and spatula portions, in accordance with some embodiments of the present technology.

The arrangement described above with reference to FIGS. 2A-2C can be implemented with any of a variety of suitable tools, for example, the forks described above with reference to FIGS. 1A-1D, and/or the tools described further below with reference to FIGS. 5-6E. The arm portions 210, 220 can transition from a generally rectangular cross section at the first and second portions 260a, 260b of the guide 260, to a non-rectangular cross-section (e.g., a round cross-section, to facilitate the threaded attachment described above with reference to FIG. 1C).

Figure 2D:
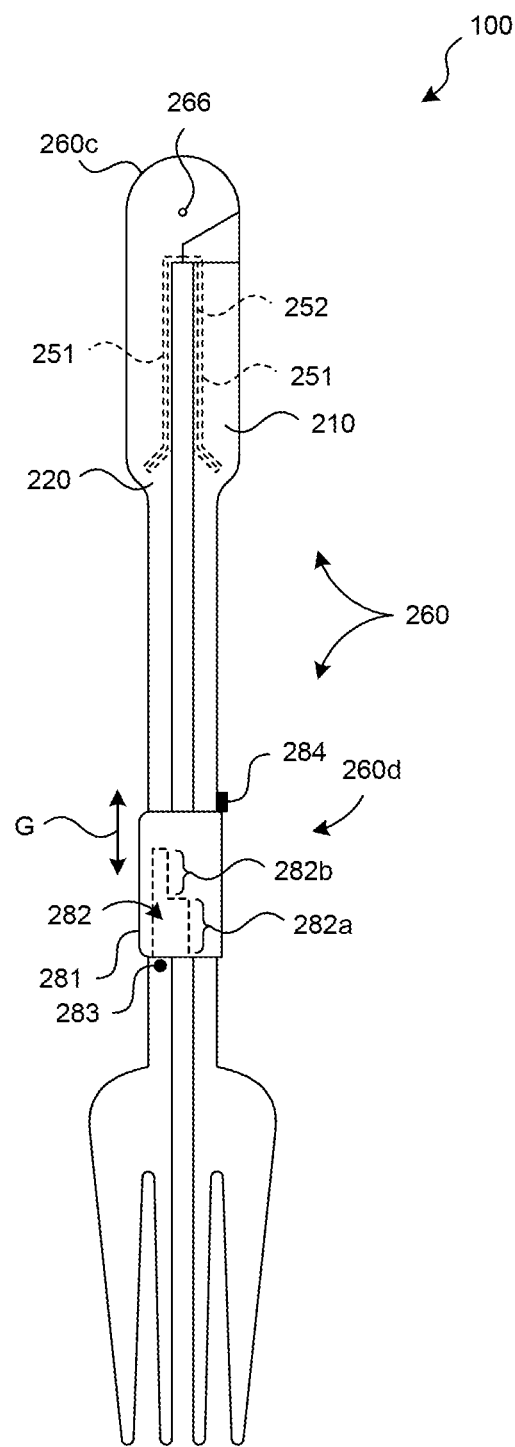
FIG. 2D is a partially schematic illustration of a utensil having a guide with a guide slot configured in accordance with embodiments of the present technology.
Figure 2E:
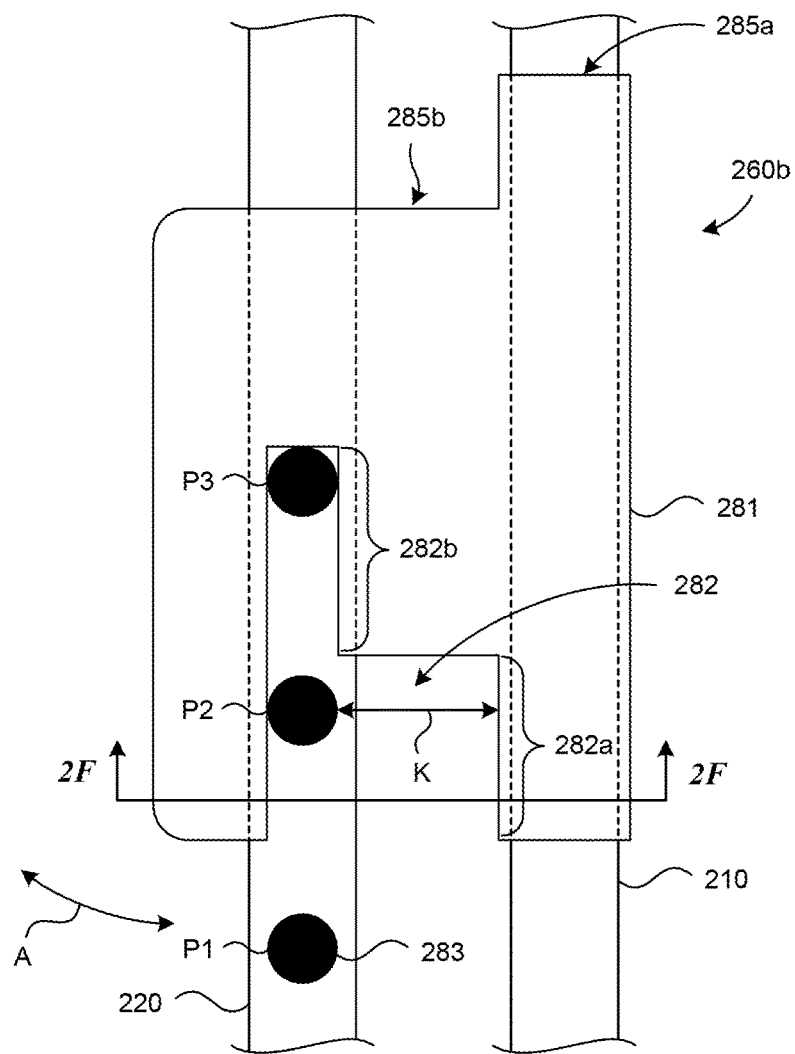
FIG. 2E is a partially schematic illustration of a representative guide of the type shown in FIG. 2D.
Figure 2F:
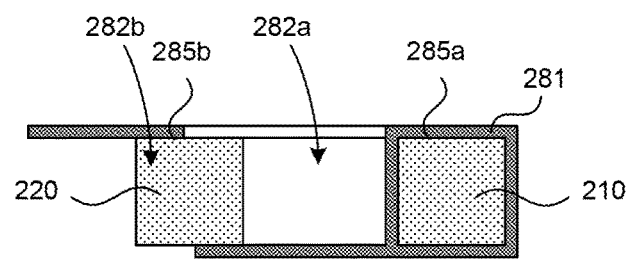
FIG. 2F is a partially schematic, cross-sectional illustration of the guide shown in FIG. 2E.

FIGS. 2D-2F illustrate another representative utensil 100 having a guide 260 configured in accordance with further embodiments of the present technology. As shown in FIG. 2D, the utensil 100 can include a first arm portion 210 and a second arm portion 220 that have an overlapping arrangement, generally similar to that described above with reference to FIGS. 2A-2C. The two arm portions 210, 220 can be pivotably connected to each other via a pivot pin 266, and can pivot up to 10°, up to 15°, up to 20°, up to 25°, up to 30°, or up to 35°, depending upon the embodiment. Each arm portion 210, 220 can include a corresponding spring aperture 251 into which a spring 252 fits, so as to bias the two arm portions away from each other in a pivoting manner. The spring aperture can include a slot in both the first and second arm portions that captures the spring 252 and terminates in holes at each end to help secure the spring 252.

The guide structure 260 can include a first guide portion 260c that operates generally in the manner described above with reference to the two guide portions 260a, 26b shown in FIGS. 2A-2C, and a second guide portion 260d that operates in a manner somewhat similar to that described above with reference to FIGS. 1E-1F. In a particular aspect of this embodiment, the second guide portion 260d includes a guide body 281 that slides relative to both the first arm portion 210 and the second arm portion 220, as indicated by arrow G. The upward motion of the second guide portion 260d (as viewed in FIG. 2D) is constrained by a guide stop 284 carried by the first arm portion 210. The downward motion of the second guide portion 260b is constrained by a guide pin 283, carried by the second arm portion 220.

The guide body 281 includes a guide slot 282 having a first slot portion 282a and a second slot portion 282b, with the second slot portion 282b being narrower than the first slot portion 282a. When the guide body 281 is positioned above the guide pin 283 (as shown in FIG. 2D), the second guide portion 260d does not constrain the motion of the second arm portion 220 relative to the first arm portion 210. Instead, that motion is constrained by the first guide portion 260c, generally in the manner described above with reference to FIGS. 2A-2C. When the guide body 281 is moved downwardly over the guide pin 283, the guide body 281 controls the rotational motion of the second arm portion 220 relative to the first arm portion 210 in a manner that depends upon whether the guide pin 283 is positioned within the first slot portion 282a or the second slot portion 282b, as described further below with reference to FIGS. 2E and 2F.

FIG. 2E is a partially schematic, plan view of the second guide portion 260d, and FIG. 2F is a partially schematic, cross-sectional illustration of the second guide portion 260d, taken substantially along line 2F-2F of FIG. 2E. Referring to FIGS. 2E and 2F together, the guide body 281 includes a first arm channel 285a in which the first arm portion 210 is received, and a second arm channel 285b in which the second arm portion 220 is received. The cross-sectional shape of the first arm channel 285a can be configured to allow the guide body 281 to slide over the first arm portion 210. In some embodiments, the fit between the first arm portion 210 and the first arm channel 285a is snug. Accordingly, the user can slide the guide body 281 to a desired position, and it will stay in that position until the user moves it again. The second arm channel 285b can be open-ended and large enough to allow the guide body 281 to slide over the second arm portion 220, e.g., via a snug fit that requires deliberate force on the part of the user, as discussed above. Referring now to FIG. 2E, when the guide pin 283 (which is carried by the second arm portion 220) is in a first position P1, the second arm 220 can move toward and away from the first arm 210a, unencumbered by the guide body 281, as indicated by arrow A. When the guide pin 283 has a second position P2, it can move back and forth within the constrained space of the first slot portion 282a, as indicated by arrow K. When the guide pin 283 has a third position P3 (in the second slot portion 282b), the second arm portion 220 is generally fixed relative to the first arm portion 210. Accordingly, the user can select the first position P1 for maximum motion, or the second position P2 for constrained motion (e.g., like a pair of tweezers), or the third position P3 for no motion (e.g., like a standard fork).

Figure 3:
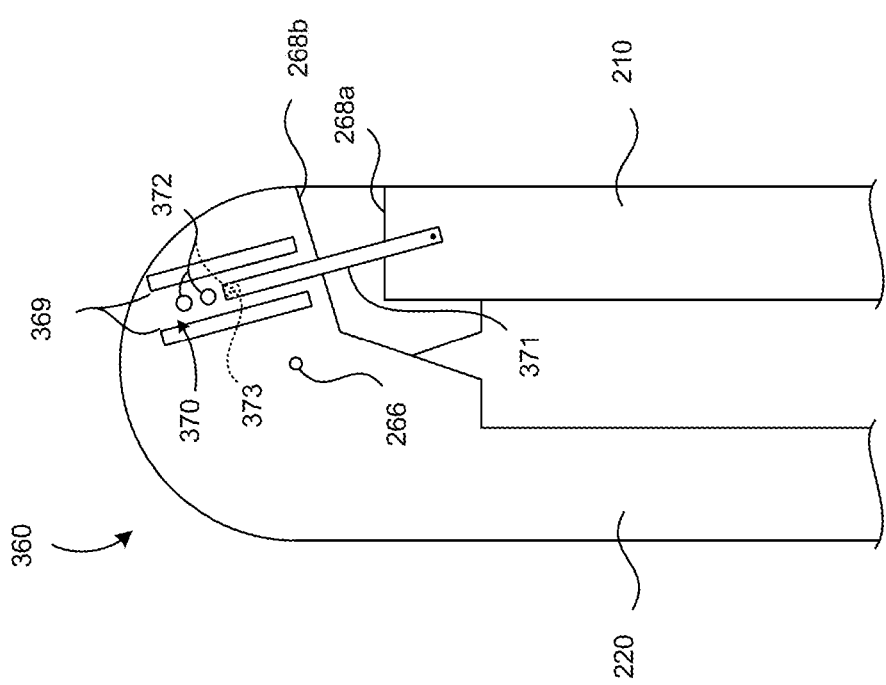
FIG. 3 is a partially schematic illustration of a guide for controlling the pivoting motion of a utensil in accordance with some embodiments of the present technology.

FIG. 3 schematically illustrates another arrangement for guiding the arcuate motion of the arm portions, in accordance with some embodiments of the present technology. In one aspect of an embodiment shown in FIG. 3, a guide 360 includes guide walls 369 (e.g., extending upwardly from the plane of FIG. 3) forming a slot 370 therebetween. The slot 370 includes multiple detent apertures 372, and the guide walls 369 and detent apertures 372 can be carried by the second arm portion 220. The first arm portion 210 can carry a guide rod 371 having a detent projection 373 that faces downwardly toward the detent apertures 372. As the user moves the first arm portion 210 relative to the second arm portion 220, the guide rod 371 moves the detent projection 373 from one detent aperture 372 to another. The stop surfaces 268a, 268b can limit the rotational motion of the arm portions relative to each other, as described above with reference to FIG. 2C.

Figure 4:
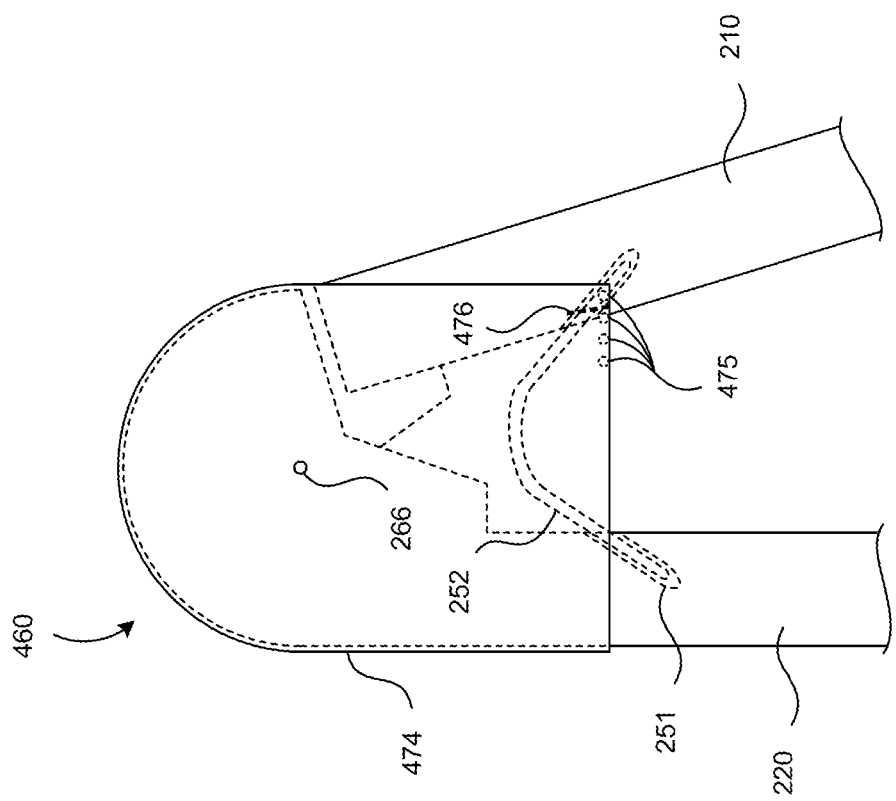
FIG. 4 is a partially schematic illustration of an arrangement for guiding the pivoting motion of a utensil in accordance with some embodiments of the present technology.

FIG. 4 illustrate a guide 460 configured in accordance with some embodiments of the present technology, and which includes a housing or cover 474 extending over and under the first arm portion 210 and the second arm portion 220 (e.g., above and below the plane of FIG. 4). Accordingly, the arm portions 210, 220 fit inside the cover 474. The upper portion of the cover 474 can include multiple downwardly-extending cover detents 475, and the first arm portion 210 can include one or more upwardly-extending arm detents 476 (one is shown in FIG. 4). As the user moves the first arm portion 210 relative to the second arm portion 220, the arm detent 476 successively engages with different cover detents 475 to temporarily secure the second arm portion 220 relative to the first arm portion 210 in any of several possible positions. The cover detents 475 and arm detent 476 can resist the outwardly biasing force of the spring 252, while not providing so much resistance as to interfere with the user's deliberate motions to move one arm portion relative to the other. The cover 474 can be used in combination with any of the utensils described herein.

In some embodiments, the arm portions can move axially relative to each other, in addition to moving arcuately relative to each other. For example, FIG. 5 illustrates a utensil 500 having a first tool 530 that can include a spatula 535, and a second tool 540 that can include a fork 543. Accordingly, the utensil 500 can operate in the manner of a barbeque fork and spatula, and/or can operate as an eating utensil with added stability not available with conventional eating utensils. The spatula 535 can flex, as shown in dashed lines in FIG. 5. The first tool 530 can include a first handle portion 533*a*, and the second tool 540 can include a second handle portion 533*b*. The handle portions are attached to corresponding arm portions 510, 520, and at least one of the handle portions can move axially relative to the other, as indicated by arrow Q. For example, the first handle portion 533*a* can include a handle detent 575, e.g., one or more spring-biased extensions that engage with corresponding arm detents 576 having the form of outwardly extending protrusions, generally similar to the arrangement described above with reference to FIG. 1A. The user can slide the first tool 530 axially relative to the second tool 540, with the detents 575, 576 resisting the motion to provide the user with suitable control over the axial movement. In operation, the user can grasp food between the first tool 530 and the second tool 540 and then slide or retract the first tool 530 to eat the food. This arrangement can stabilize the food on the utensil 500, which can be particularly beneficial to users having hand tremors or other disabilities that make it difficult to control the motion of the utensil and keep the food on the utensil. In some embodiments, the utensil 500 can include a spring between the arm portions 510, 520 (e.g., as shown and described above with reference to FIGS. 1A, 2B and 2C), to help release the tool when the user relaxes the force he or she provides to bias the arm portions 510, 520 toward each other.

Embodiments of the technology described above with reference to FIG. 5 allow the user to stabilize food on a fork. In other embodiments, a similar approach can be used to stabilize food in a spoon. For example, referring now to FIG. 6A, a utensil 600*a* can include a first tool 630 (e.g., a cover 636) coupled to a second tool 640 (e.g., a spoon 644). The first tool 630 can include a first handle portion 633*a* connected to a corresponding first arm portion 610, and pivotally connected to the cover 636 at a pivot joint 677. The second tool 640 can include a second handle portion 633*b* connected to a second arm portion 620. In operation, the user scoops liquid into the spoon 644 and slides the cover 636 over the spoon 644, e.g., before or as the user brings the utensil 600*a* toward his or her mouth. The cover 639 can provide an air-tight (or liquid-tight) seal with the perimeter of the spoon 644 to reduce or eliminate spills. Once the user has stabilized the utensil 600*a* at or within the user's mouth, the user can slide the cover 636, as indicated by arrow S to expose the spoon 644 and sip, tip, or suck the contents of the spoon 644 into his or her mouth. The pivot joint 677 can include a biasing element (e.g., a coil spring or other spring 652) that biases the cover 636 toward the spoon 644. As the user slides the cover 636 upwardly and to the right, as indicated by arrow S, the cover 636 can pivot downwardly to continue covering the contents of the spoon 644 as the user removes the contents of the spoon 644.

Figure 6A:
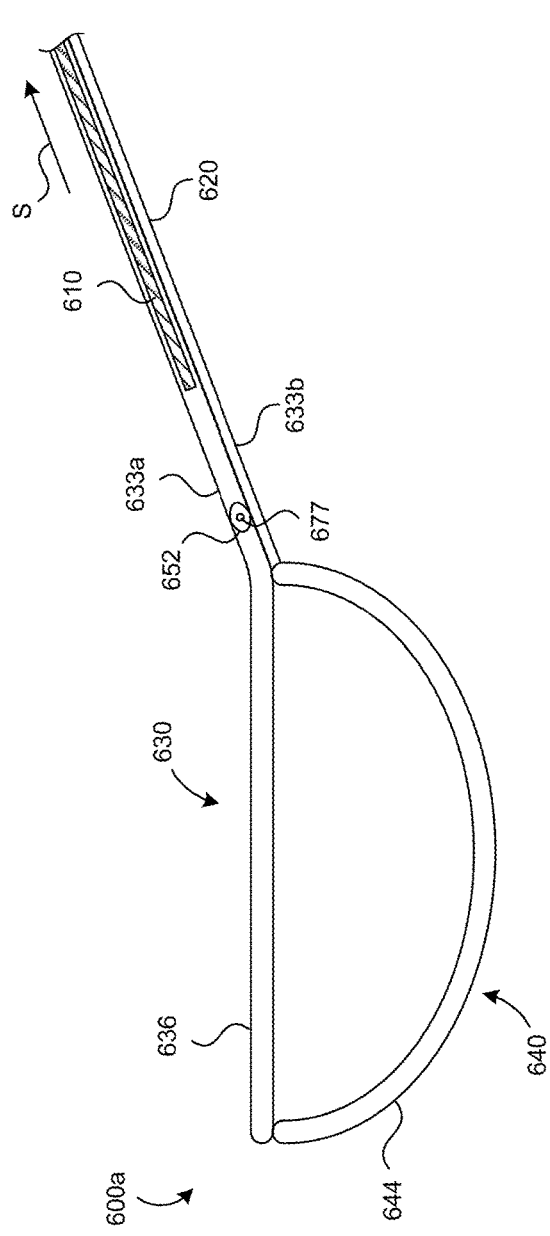
FIG. 6A is a partially schematic, cross-sectional illustration of a utensil having a spoon portion and a movable cover portion, configured in accordance with some embodiments of the present technology.
Figure 6B:
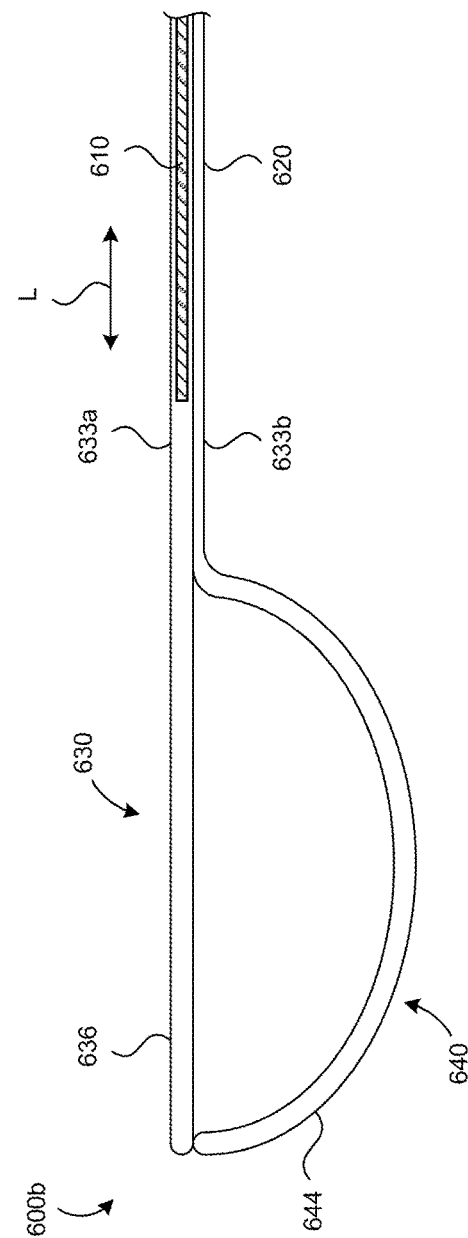
FIG. 6B is a partially schematic, cross-sectional illustration of a utensil having a spoon portion and retractable cover portions configured in accordance with some embodiments of the present technology.

FIG. 6B illustrates a utensil 600*b* having a cover 636 without the pivot joint 677 described above. Instead, the cover 636 can be rigidly attached to the first handle portion 633*a* and can slide linearly back and forth as indicated by arrow L. An expected advantage of this configuration is that it may be simpler to implement than the configuration shown in FIG. 6A. Conversely, an advantage of the arrangement shown in FIG. 6A is that it may more securely cover the contents of the spoon 644 as the user eats.

Figure 6C:
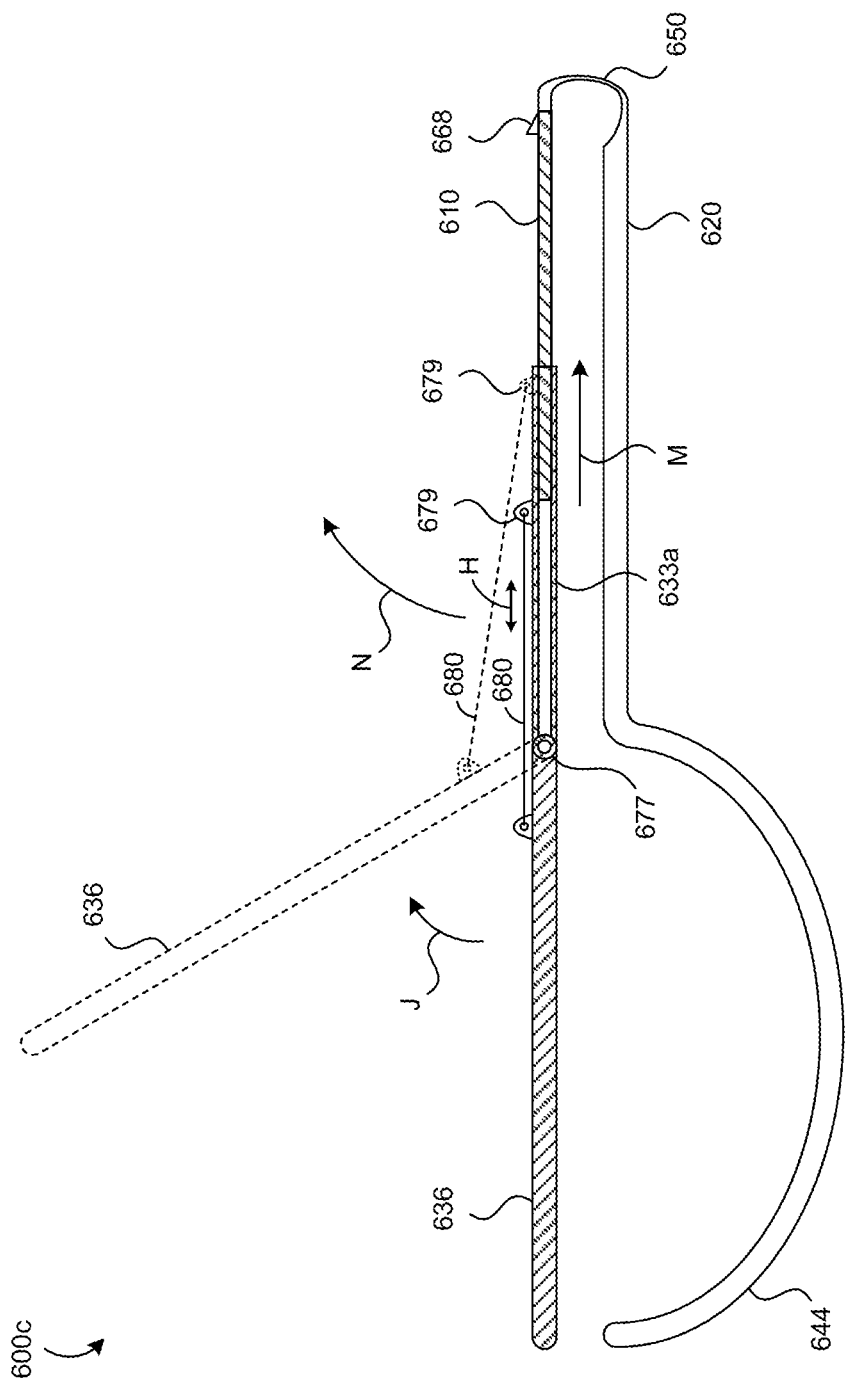
FIGS. 6C-6E are partially schematic illustrations of utensils having configurations in accordance with some embodiments of the present technology.

FIG. 6C is a partially schematic, partial cross-sectional illustration of a utensil 600*c* configured in accordance with some embodiments of the present technology. The utensil 600*c* can include a first arm portion 610, second arm portion 620, and hinge 650 configured to bias the arm portions relative to each other. The second arm portion 620 can support a spoon 644, and the first arm portion 610 can support a cover 636. The cover 636 can move relative to the spoon 644 in accordance with one or more of three modalities, all of which are shown together in FIG. 6C. In the first modality, the cover 636 is connected via a pivot 677 to a corresponding first handle portion 633*a*. The first handle portion 633*a* carries a knob 679 connected via a lever 680 to the cover 636. The knob 679 can slide back and forth relative to the first handle portion 633*a*, as indicated by arrow H. As shown in solid lines in FIG. 6C, the cover 636 is in a closed position. When the knob 679 is moved to the right, it pulls the lever 680, raising the cover 636, as shown in dashed lines, and as indicated by arrow J.

In a second modality, the combined cover 636 and first handle portion 633*a* can slide over the first arm portion 610 to the right, as indicated by arrow M to uncover the spoon 644. The cross section of the first handle portion 633*a* can be rectangular, as can the cross section of the first arm portion 610, to limit rotation of these components relative to each other. The user can slide the first handle portion 633*a* using the same or a different knob as is used to pivot the cover 636. The utensil 600*a* can include a stop 668 to limit the linear motion of the cover 636 and the first handle portion 633*a* when these two elements are moved as a unit to uncover the spoon 644.

In a third modality, the cover 636, the first handle portion 633*a*, and the first arm portion 610 can be pivoted as a unit upwardly and away from the spoon 644, as indicated by arrow N, under the biasing force of the spring portion 650.

In any of the foregoing embodiments, the utensil 600*c* can include guide mechanisms, stop mechanisms, and/or other features described earlier in the present disclosure. A particular utensil can be configured to operate in accordance with any one or more of the three motion modalities described above.

Figure 6D:
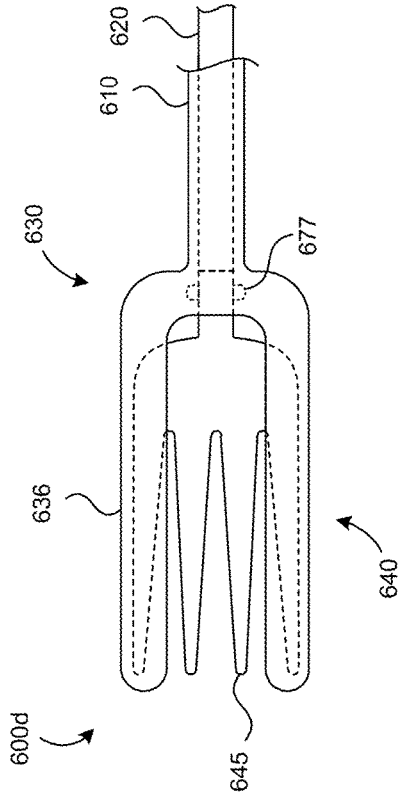

In other embodiments, a generally similar arrangement can be used to control the motion of different tools. For example, FIG. 6D illustrates a second arm portion 620 carrying a fork 645, and a first arm portion 610 carrying a cover 636 that is shaped to overlie the outer two tines of the fork 645. The cover 636 can be coupled to the first arm portion 610 or a corresponding handle via pivot 677 to rotate upwardly out of the plane of FIG. 6D. The utensil 600*d* can include any one or more of the motion features described above with reference to FIG. 6C or the previously described arrangements.

Figure 6E:
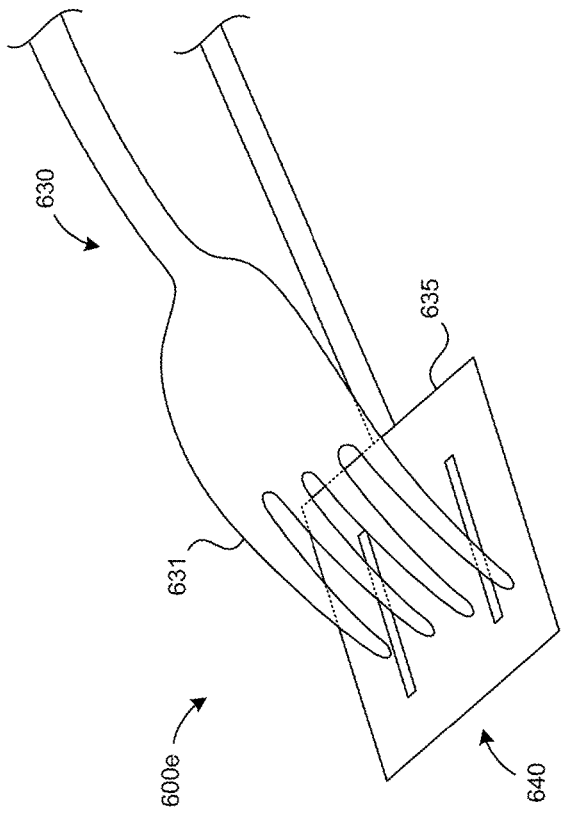

FIG. 6E illustrates still another utensil 600*e* in which the first tool 630 includes a fork 631, and the second tool 630 includes a spatula 635. Again, the first tool 630 and the second tool 640 can include any suitable arrangement for relative movement between these components discussed above with reference to FIGS. 1A-6C. For example, the fork 631 can slide axially relative to the spatula 640, and/or can pivot relative to the spatula 640. The spatula 640 can also slide axially and/or pivot relative to the fork 631.

Several of the arrangements described above can provide the user with one or more of multiple advantages, when compared with conventional utensils. For example, utensils having two fork tools can function as a conventional fork, or can function like chopsticks or tweezers. In another mode of operation, the two spaced-apart fork tools can be placed on opposite sides of the food, and then brought together to force the food onto the now-wider fork. This can eliminate the need for the user to employ a finger or a knife to push the food onto the utensil, and can have particular applicability to small or lightweight or spherical food, such as a grape or a cherry.

In still another mode of operation, one or both of the fork tools 131, 141 shown in FIG. 1A can be rotate 90° relative to the plane of FIG. 1A to operate as a clamp to hold the food on or against the opposing tool. When the utensil includes a spatula, the spatula can be used to hold or stabilize the food on the fork portion of the utensil.

Another of the features described above is that some embodiments of the utensil can include replaceable tools. Accordingly, the user can easily change the tools described above, and/or can use any suitable combination of the tools described above to achieve a particular purpose. Accordingly, for example, users having particular physical capabilities and/or limitations can choose the combination of tools that best suits them.

Still another feature of several embodiments described above is that the utensil can include a cover or a grasping element that moves relative to another portion of the utensil (e.g., a fork or spoon portion). This arrangement can stabilize the food, and can be particularly effective for users with tremors or other movement disorders.

From the foregoing, it will be appreciated that representative embodiments of the present technology have been described herein for purposes of illustration, but that various modifications may be made without deviating from the present technology. For example, the specific details of the guide structures, spring structures, and other elements may be different in some embodiments. As another example, the pivot joint 677 shown in FIG. 6A can be at or within the perimeter of the spoon 644, rather than outside the perimeter. Elements shown and described as separable in some embodiments may be formed integrally with each other in some other embodiments. For example, the arm portions can be formed integrally with the tool portions and/or the hinge, and/or the spring. In general, the foregoing components described above with reference to FIGS. 1A-6B can be formed from suitable metals, plastics, and/or other suitable materials. The relative positions of the various detent elements can be reversed in some embodiments. In some embodiments, the arm portions are biased away from each other (e.g., in an embodiment shown in FIG. 1A). In some embodiments, the arm portions can be biased toward each other, e.g., to bias the lid, cover or other overlying tool into its closed portion. For example, the hinge 250 shown in FIG. 2B, and/or the hinge 650 shown in FIG. 6C can have a spring-type function (or can include a separate spring) to bias the corresponding tools toward each other, which can have particular utility for users who have hand tremors, as this bias direction can help keep the food in place as the user moves the food to his/her mouth.

Certain aspects of the technology described in the context of some embodiments may be combined or eliminated in other embodiments. For example, the configuration shown in FIG. 5 can include any of the arcuate control arrangements and devices described elsewhere in the present disclosure. In some embodiments, one or more of the tools moves axially (for removal/replacement and/or for use), and in some embodiments, one or more of the tools can have a fixed axial position. Further, while advantages associated with embodiments of the technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

As used herein, the term "and/or" as in "A and/or B" refers to A alone, B alone and both A and B. To the extent any materials incorporated herein by reference conflict with the present disclosure, the present disclosure controls.

The following examples provide still further illustrative configurations.

1. An eating utensil, comprising:
    a first tool carried by and movable relative to a first arm portion;
    a second tool carried by and movable relative to a second arm portion;
    a hinge coupling the first and second arm portions; and
    a guide structure coupled to the first and second arm portions to guide motion of at least one of the first and second tools relative to the other.

2. The utensil of example 1 wherein the first tool includes a first portion of a fork, and wherein the second tool includes a second portion of a fork.

3. The utensil of example 2 wherein the first and second arm portions are movable relative to each other about the hinge through an angular range, and wherein the angular range includes a position in which a tip of an innermost tine of the first portion of the fork portion contacts a tip of an innermost tine of the second portion of the fork.

4. The utensil of example 1 wherein the first and second tools are different.

5. The utensil of example 4 wherein the first tool includes a spatula and the second tool includes a fork.

6. The utensil of example 4 wherein the first tool includes a cover and the second tool includes a spoon.

7. The utensil of example 1 wherein at least one of the first tool and the second tool is retractable along the corresponding one of the first arm portion and the second arm portion.

8. The utensil of example 1 wherein at least one of the first tool and the second tool is removable from the corresponding one of the first arm portion and the second arm portion.

9. The utensil of example 1 wherein at least one of the first tool and the second tool is rotatable relative to the corresponding one of the first arm portion and the second arm portion.

10. The utensil of example 1 wherein an axial position of at least one of the first tool and the second tool is adjustable relative to the corresponding one of the first arm portion and the second arm portion.

11. The utensil of example 1 wherein the first and second arm portions are identical.

12. The utensil of example 1 wherein the guide structure is positioned to restrict angular motion of at least one of the first and second arms portions relative to the other.

13. The utensil of example 1 wherein the guide structure includes a latch carried by one of the first and second arm portions and movable toward and away from the other of the first and second arm portions.

14. The utensil of example 1 wherein the hinge includes a pivot pin.

15. The utensil of example 1 wherein the hinge is integral with the first and second arm portions.

16. An eating utensil, comprising:
    a first fork portion having a first set of tines;
    a first arm portion carrying the first fork portion, with the first fork portion movable relative to the first arm portion and removable from the first arm portion;
    a second fork portion have a second set of times;

a second arm portion carrying the second fork portion, with the second fork portion movable relative to the second arm portion and removable from the second arm portion;

a spring coupling the first and second arm portions and biasing the first and second arm portions to a default position; and a guide structure coupled to the first and second arm portions to guide arcuate motion of at least one of the first and second tools relative to the other, in a first direction away from the default position, and a second direction toward the default position, wherein in at least one position other than the default position, a tip of an innermost tine of the first fork portion contacts a tip of an innermost tine of the second fork portion.

17. The utensil of example 16 wherein the guide structure includes a pivot pin.

18. An eating utensil, comprising:
a first fork portion having a first set of tines;
a first arm portion carrying the first fork portion;
a second fork portion have a second set of times;
a second arm portion carrying the second fork portion;
a spring coupling the first and second arm portions and biasing the first and second arm portions to a default position; and
a guide structure coupled to the first and second arm portions to guide arcuate motion of at least one of the first and second tools relative to the other, in a first direction away from the default position, and a second direction toward the default position, the guide structure including:
a pivot pin pivotably coupling the first arm portion to the second arm portion;
a guide body slideable along the first and second arm portion, the guide body have a guide slot with a first portion of the guide slot having a first width, and a second portion of the guide slot having a second width less than the first width;
a guide stop carried by one of the first and second arm portions and positioned to restrict motion of the guide body along the at least one arm portion; and
a guide pin carried by the other of the first and second arm portions and positioned to be received in the guide slot, wherein:
the first and second arm portions are pivotable relative to each other about the pivot pin through a first angular range when the guide pin is positioned outside the guide slot;
the first and second arm portions are pivotable relative to each other about the pivot pin through a second angular range less than the first angular range when the guide pin is positioned in the first portion of the guide slot; and wherein
the first and second arm portions have a fixed angular orientation relative to each other when the guide pin is positioned in the second portion of the guide slot.

19. The utensil of example 18 wherein the pivot pin pivotably connects a flat part of the first arm portion to a flat portion of the second arm portion.

20. The utensil of example 18 wherein the first and second angular ranges include a position in which a tip of an innermost tine of the first fork portion contacts a tip of an innermost tine of the second fork portion.

21. The utensil of example 18 wherein facing surfaces of the tips of the innermost tines are flattened.

I claim:

1. An eating utensil, comprising:
a first fork portion having a first set of tines;
a first arm portion carrying the first fork portion;
a second fork portion have a second set of times;
a second arm portion carrying the second fork portion;
a spring coupling the first and second arm portions and biasing the first and second arm portions to a default position; and
a guide structure coupled to the first and second arm portions to guide arcuate motion of at least one of the first and second arm portions relative to the other, in a first direction away from the default position, and a second direction toward the default position, the guide structure including:
a pivot pin pivotably coupling the first arm portion to the second arm portion;
a guide body slideable along the first and second arm portion, the guide body have a guide slot with a first portion of the guide slot having a first width, and a second portion of the guide slot having a second width less than the first width;
a guide stop carried by one of the first and second arm portions and positioned to restrict motion of the guide body along the at least one arm portion; and
a guide pin carried by another of the first and second arm portions and positioned to be received in the guide slot, wherein:
the first and second arm portions are pivotable relative to each other about the pivot pin through a first angular range when the guide pin is positioned outside the guide slot;
the first and second arm portions are pivotable relative to each other about the pivot pin through a second angular range less than the first angular range when the guide pin is positioned in the first portion of the guide slot; and wherein
the first and second arm portions have a fixed angular orientation relative to each other when the guide pin is positioned in the second portion of the guide slot.

2. The utensil of claim 1 wherein the pivot pin pivotably connects a flat part of the first arm portion to a flat portion of the second arm portion.

3. The utensil of claim 1 wherein the first and second angular ranges include a position in which a tip of an innermost tine of the first fork portion contacts a tip of an innermost tine of the second fork portion.

4. The utensil of claim 3 wherein facing surfaces of the tips of the innermost tines are flattened.

* * * * *